(12) United States Patent
Dhanabalan et al.

(10) Patent No.: US 12,489,717 B2
(45) Date of Patent: Dec. 2, 2025

(54) IDENTIFYING SWITCHING PATHS FOR PORTS OF CROSSPOINT SWITCH

(71) Applicant: Cisco Technology, Inc., San Jose, CA (US)

(72) Inventors: Madheswaran Dhanabalan, Bangalore (IN); Deepak Behera, Bangalore (IN)

(73) Assignee: CISCO TECHNOLOGY, INC., San Jose, CA (US)

( * ) Notice: Subject to any disclaimer, the term of this patent is extended or adjusted under 35 U.S.C. 154(b) by 312 days.

(21) Appl. No.: 18/365,640

(22) Filed: Aug. 4, 2023

(65) Prior Publication Data
US 2025/0047620 A1 Feb. 6, 2025

(51) Int. Cl.
*H04L 12/66* (2006.01)
*H04L 49/1515* (2022.01)
*H04L 49/253* (2022.01)

(52) U.S. Cl.
CPC ........ *H04L 49/253* (2013.01); *H04L 49/1515* (2013.01)

(58) Field of Classification Search
CPC ..... H04L 12/44; H04L 49/1515; H04L 45/48; H04L 45/02; H04L 49/101; H04L 45/22; H04L 41/12; H04L 49/25
See application file for complete search history.

(56) References Cited

U.S. PATENT DOCUMENTS

| | | |
|---|---|---|
| 2015/0110488 A1 | 4/2015 | Schlansker et al. |
| 2015/0188808 A1 | 7/2015 | Ghanwani et al. |
| 2017/0126590 A1 | 5/2017 | Jaiwant et al. |
| 2018/0109440 A1 | 4/2018 | Knee |
| 2021/0281506 A1 | 9/2021 | White et al. |
| 2022/0078104 A1 | 3/2022 | Yallouz et al. |

OTHER PUBLICATIONS

European Search Report for European Application No. 24186492.5, dated Nov. 28, 2024, 11 Pages.

*Primary Examiner* — Kharye Pope
(74) *Attorney, Agent, or Firm* — Baker Botts L.L.P.

(57) ABSTRACT

A method includes identifying a switching path for source ports and destination ports of a crosspoint based switch including a two-tiered spine-and-leaf architecture. The method includes determining whether a switching path for a connection between a source port and a destination port is available, and identifying whether the source port and the destination port are associated with a same leaf. In response to determining that the switching path is available, the method includes executing a connection between the source port and the destination port utilizing a switching path on the same leaf. In response to determining that the switching path is unavailable, the method includes identifying whether free connections are available between a source leaf and a spine and a destination leaf and the spine. When the free connections are unavailable, the switching path for the connection between the source port and the destination port is executable by rewiring.

20 Claims, 13 Drawing Sheets

IDENTIFYING SWITCHING PATHS FOR PORTS OF CROSSPOINT SWITCH

TECHNICAL FIELD

This disclosure relates generally to a crosspoint based switch, and, more specifically, to identifying a switching path for source ports and destination ports of a crosspoint based switch.

BACKGROUND

Generally, in devices including two-tier Clos architectures, each lower-tier crosspoint (leaf layer) may be connected to each top-tier crosspoint (spine layer) in a full-mesh topology. The leaf layer may be connected to the front panel ports and the spine layer may be utilized to interconnect leaf layers. For example, each leaf crosspoint may have provision for one or more connections to each spine crosspoint in the architecture. In some examples, connection paths may be selected, such that leaf layer ports may be connected to each other. In such an architecture, for example, where a path between two leaf crosspoints is not available, an alternate spine crosspoint may be utilized. Various other techniques of enhancing two-tier Clos architectures may also be performed. However, many of the foregoing examples may lead to undesirable network disruptions.

DESCRIPTION OF EXAMPLE EMBODIMENTS

Overview

Figure 1:
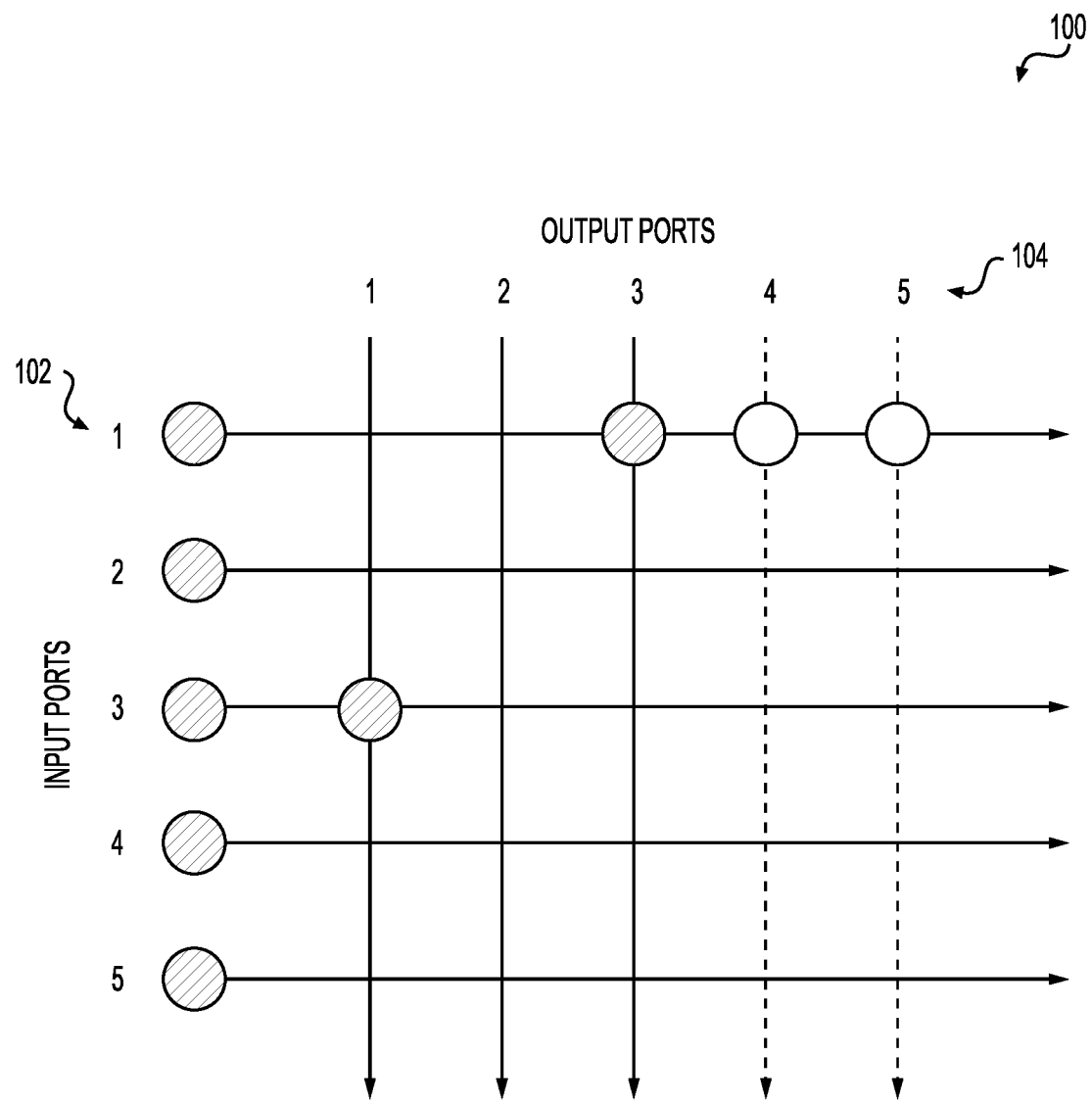
FIG. 1 illustrates an example layer-1 (L1) crosspoint device.

The present embodiments are directed to techniques for identifying a switching path for one or more source ports and destination ports of a crosspoint based switch including a two-tiered spine-and-leaf architecture. In particular embodiments, a computing system may determine whether a switching path for a potential connection between a source port and a destination port is available. For example, in particular embodiments, the computing system may determine whether the switching path for the potential connection between the source port and the destination port is available by identifying whether the source port and the destination port is associated with a same leaf. In particular embodiments, when the source port and the destination port are associated with the same leaf, the computing system may determine that the switching path for the potential connection between the source port and the destination port is executable without utilizing a spine. In particular embodiments, when the source port and the destination port are not associated with the same leaf, the computing system may determine the switching path for the potential connection between the source port and the destination port is executable by utilizing a spine.

In particular embodiments, in response to determining that the switching path for the potential connection between the source port and the destination port is available, the computing system may execute a connection between the source port and the destination port utilizing a switching path on the same leaf. In particular embodiments, in response to determining that the switching path for the potential connection between the source port and the destination port is unavailable, the computing system may then identify whether one or more free connections are available between 1) a source leaf and a spine and 2) a destination leaf and the spine.

In particular embodiments, when the one or more free connections are available, the computing system may determine that the switching path for the potential connection between the source port and the destination port is executable without disruption to existing connections. In particular embodiments, when the one or more free connections are unavailable, the computing system may determine that the switching path for the potential connection between the source port and the destination port is executable by rewiring one or more of the existing connections. In particular embodiments, one or more of the existing connections may be rewired so as to minimize disruption to the existing connections.

In particular embodiments, in response to determining that the switching path for the potential connection between the source port and the destination port is unavailable, the computing system may execute a connection between the source port and the destination port utilizing a switching path based on the one or more free connections. In particular embodiments, in response to determining that the switching path for the potential connection between the source port and the destination port is unavailable, executing a connection between the source port and the destination port utilizing a switching path based on the rewiring of one or more of the existing connections. In particular embodiments, the potential connection between the source port and the destination port may include a unicast connection. In particular embodiments, the potential connection between the source port and the destination port may include a multicast connection.

In particular embodiments, the destination port may include a first destination port. In particular embodiments, when the first destination port and a second destination port are associated with a same leaf, the computing system may execute the connection between the source port and the destination port by duplicating the switching path on the same leaf. In particular embodiments, when the first destination port and the second destination port are each associated with a different leaf, the computing system may execute the connection between the source port and the destination port by duplicating the switching path on a same spine. In particular embodiments, when at least one of the duplication of the switching path on the same leaf or the duplication of the switching path on the same spine is unavailable, the computing system may execute the connection between the source port and the destination port utilizing a number of spines. In particular embodiments, the rewiring of one or more of the existing connections may include a source port to a spine rewiring. In particular embodiments, the rewiring of one or more of the existing connections may include a spine to destination port rewiring. In particular embodiments, the rewiring of one or more of the existing connections comprises 1) a source port to a spine rewiring and 2) a spine to destination port rewiring.

Technical advantages of particular embodiments of this disclosure may include one or more of the following. Certain systems and methods described herein may provide a graduated or stepped connection path determination in which an L1 crosspoint based switch having a spine-and-leaf architecture attempts to identify a switching path in which: 1) no spine crosspoint is utilized when the potential connection includes a source port and a destination port on the same leaf crosspoint, 2) only free connections between the leaf crosspoint and spine crosspoint are utilized when available, and 3) rewiring is performed with in an ordered sequence of: (a) perform a source to spine rewiring, (b) perform a spine to destination rewiring. (c) perform a source to spine rewiring along with a spine to destination rewiring. (d) perform a source to destination swapping, and (e) apply multicast optimization and restart the ordered sequence. In this way, the ordered rewiring sequence may ensure that the least possible disruption is always achieved in cases of rewiring.

Other technical advantages will be readily apparent to one skilled in the art from the following figures, descriptions, and claims. Moreover, while specific advantages have been enumerated above, various embodiments may include all, some, or none of the enumerated advantages.

Example Embodiments

FIG. 1 illustrates an example layer-1 (L1) crosspoint device 100, in accordance with the presently disclosed embodiments. In particular embodiments, the L1 crosspoint device 100 may include switching device circuitry suitable for handling for any number of data streams, clock sources, and communication protocols. As depicted, in particular embodiments, the L1 crosspoint device 100 may include a number of input ports 102, and a corresponding number of output ports 104. For example, in particular embodiments, the input ports 102 and the output ports 104 of the L1 crosspoint device 100 may be constructed, such that it will create a path between the 2 ports to create a path.

In particular embodiments, as described herein, the L1 crosspoint device 100 may be electrically designed and constructed utilizing one or more crosspoint processing devices. For example, when a crosspoint processing device is available with the suitable processing speed and port density for a particular application, only one crosspoint processing device may be utilized to construct the L1 crosspoint device 100, for example. However, in other examples in which a crosspoint processing device is unavailable with the suitable processing speed and port density for the particular application, a number of crosspoint processing devices may be utilized to construct the L1 crosspoint device 100, for example, by way of a two-tiered spine-and-leaf architecture to provide suitable processing speed and port density. For example, as will be further illustrated below with to FIGS. 2A and 2B, the number of crosspoint processing devices utilized to construct the L1 crosspoint device 100 may be arranged into a combination of a number of leaf crosspoint devices and a number of spine crosspoint devices.

In particular embodiments, in the example in which a number of crosspoint processing devices is utilized to construct the L1 crosspoint device 100, for example, by way of a two-tiered spine-and-leaf architecture, switching path for inputs and output may be determined utilizing spine crosspoints and leaf crosspoints. In particular embodiments, whether a particular switching path for a potential connection is available may be determined based on, for example, a number of leaf crosspoints available in the two-tiered spine-and-leaf architecture, a number of spine crosspoints available in the two-tiered spine-and-leaf architecture, the existing connections within the two-tiered spine-and-leaf architecture, and the source ports and the destination ports involved in the potential connection.

For example, in particular embodiments, when a switching path is not available, one or more existing connections may have to be rewired or reconfigured to make way for the potential connection. As it may be appreciated, any such reconfiguration or rewiring of any existing connection may lead to undesirable disruption to the network. Thus, in accordance with the presently disclosed embodiments, it may be useful to identify a switching path for one or more source ports and destination ports of a crosspoint based switch including a two-tiered spine-and-leaf architecture so as to minimize disruption to any existing connections.

Figure 2A:
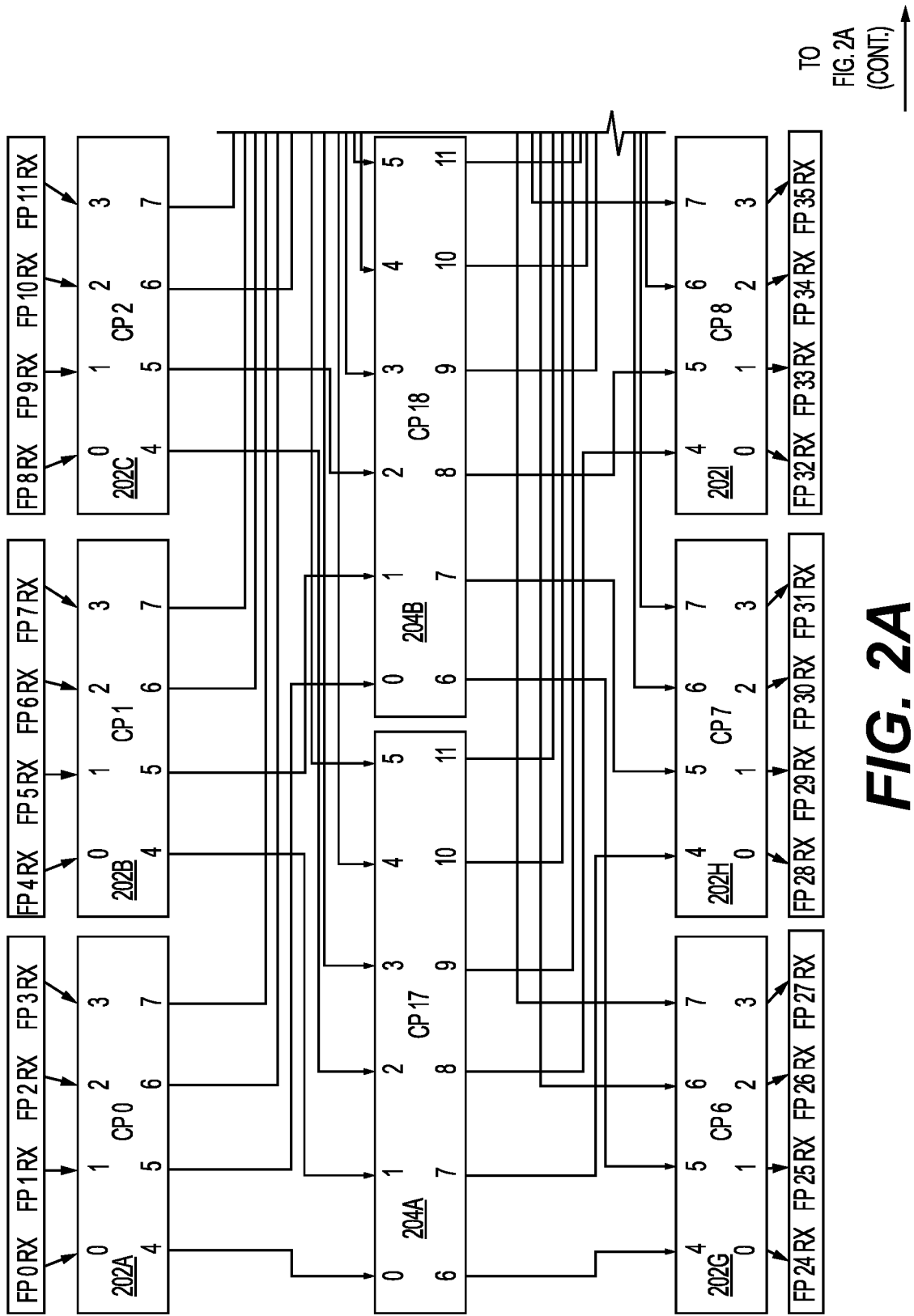
FIG. 2A illustrates an example layer-1 (L1) crosspoint based switch including a two-tiered spine-and-leaf architecture.
Figure 2A:
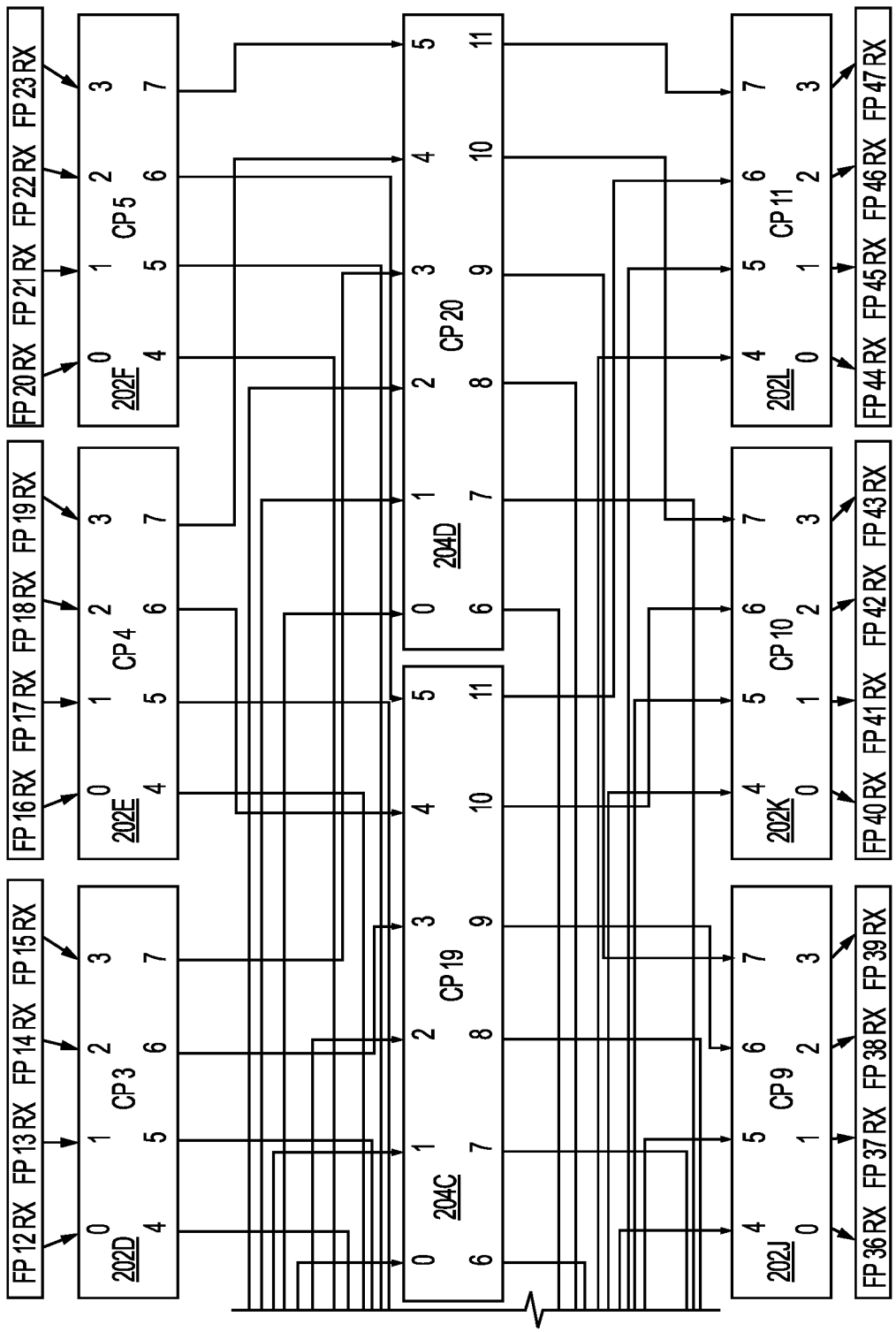

FIG. 2A illustrates an example layer-1 (L1) crosspoint based switch including a two-tiered spine-and-leaf architecture 200A, in accordance with the presently disclosed embodiments. In particular embodiments, the L1 crosspoint based switch spine-and-leaf architecture 200A may include a Clos architecture, in which each of a number of leaf crosspoints may be connected to each of a number of spine crosspoints. For example, as depicted by FIG. 2A, the L1 crosspoint based switch spine-and-leaf architecture 200A may include an input layer of leaf crosspoints 202A, 202B, 202C, 202D, 202E, and 202F (e.g., "CP0", "CP1", "CP2", "CP3" "CP4", and "CP5") and an output layer of leaf crosspoints 202G, 202H, 202I, 202J, 202K, and 202L (e.g., "CP6", "CP7", "CP8", "CP9", "CP10", and "CP11").

In particular embodiments, as further depicted by FIG. 2A, the L1 crosspoint based switch spine-and-leaf architecture 200A may also include a layer of spine crosspoints 204A, 204B, 204C, and 204D (e.g., "CP17", "CP18", "CP19", and "CP20"), in which each destination port of each leaf crosspoint of the input layer of leaf crosspoints 202A, 202B, 202C, 202D, 202E, and 202F (e.g., "CP0", "CP1", "CP2", "CP3" "CP4", and "CP5") may be connected (e.g., as inputs) to a respective source port of each spine crosspoint of the layer of spine crosspoints 204A, 204B, 204C, and 204D (e.g., "CP17", "CP18", "CP19", and "CP20"). Similarly, each destination port of each spine crosspoint of the layer of spine crosspoints 204A, 204B, 204C, and 204D (e.g., "CP17", "CP18", "CP19", and "CP20") may be further connected (e.g., as outputs) to a respective source port of each leaf crosspoint of the output layer of leaf crosspoints 202G, 202H, 202I, 202J, 202K, and 202L (e.g., "CP6", "CP7", "CP8", "CP9", "CP10", and "CP11").

Figure 2B:
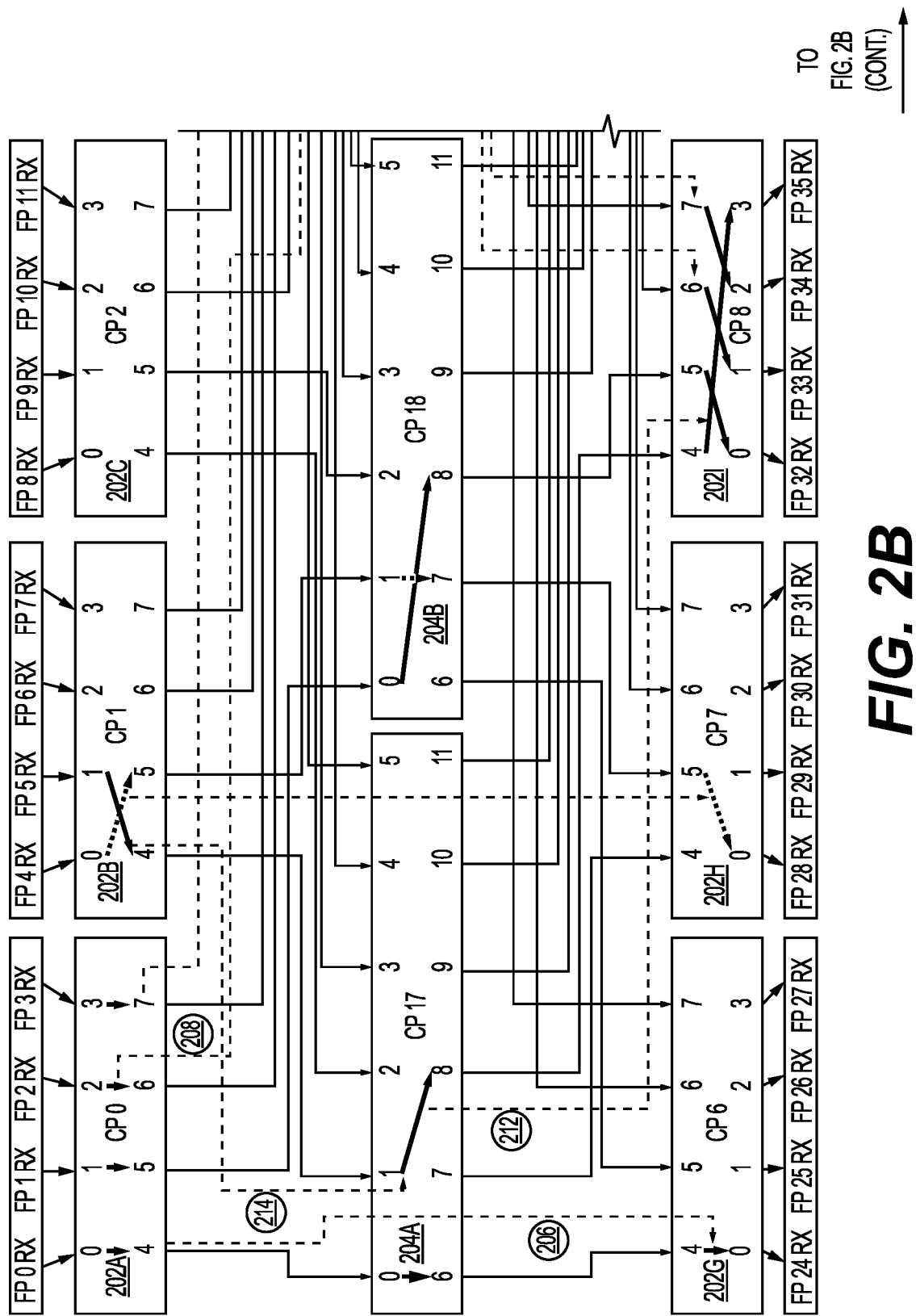
FIG. 2B illustrates a running example for identifying a switching path for one or more source ports and destination ports of a crosspoint based switch including a two-tiered spine-and-leaf architecture.
Figure 2B:
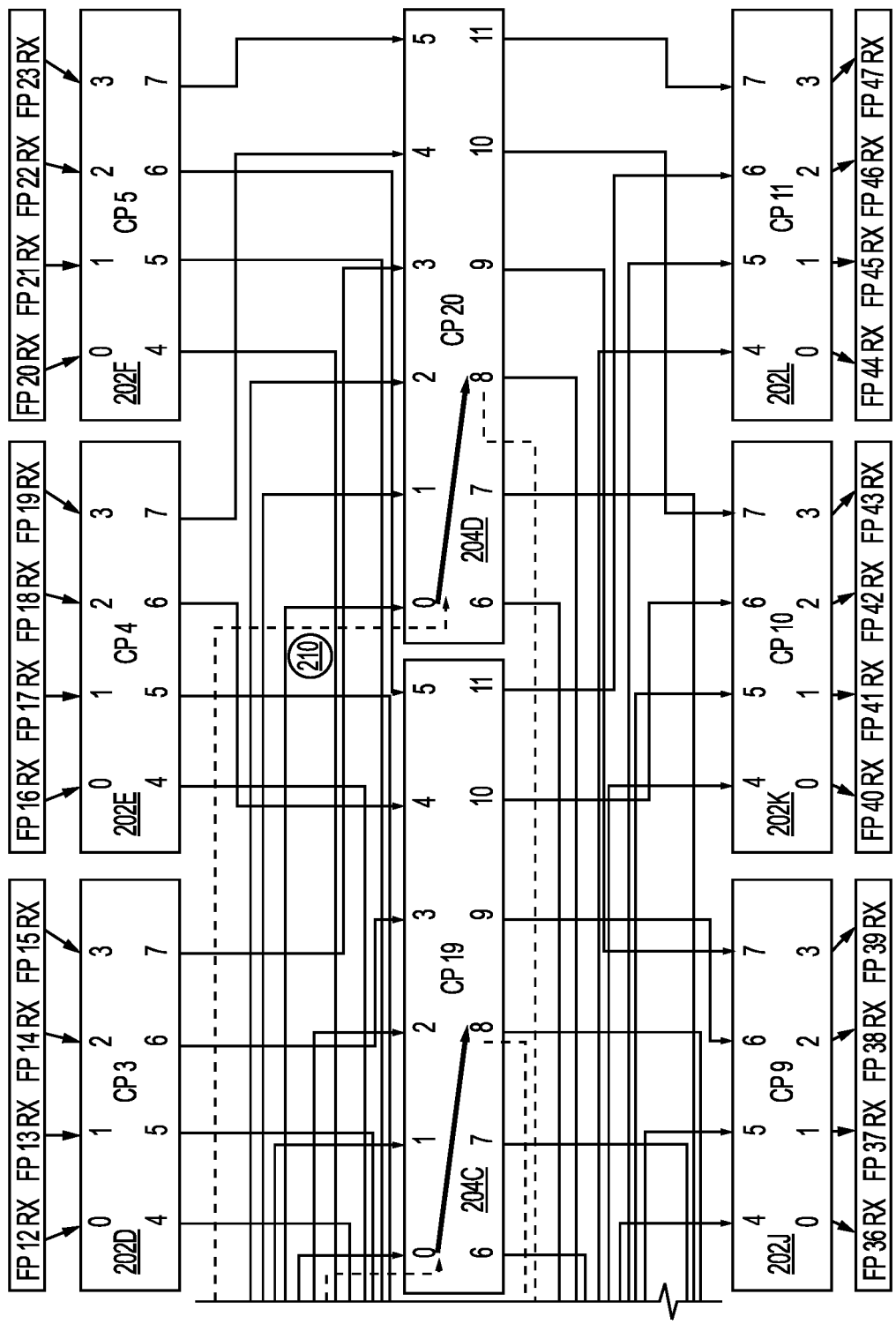

FIG. 2B illustrates a running example for identifying a switching path for one or more source ports and destination ports of a L1 crosspoint based switch including a two-tiered spine-and-leaf architecture 200B, in accordance with the presently disclosed embodiments. Specifically, FIG. 2B illustrates a running example of the operation of the L1 crosspoint based switch spine-and-leaf architecture 200B, for example, when a switching path for a potential connection (e.g., a new connection as opposed to an existing connection) is available and/or unavailable. For example, as described herein, the present embodiments include a switching sequence to identify a switching path for one or more source ports and destination ports of the L1 crosspoint based switch spine-and-leaf architecture 200B so as to minimize any disruption to existing connections.

In other words, the present embodiments provide a graduated or stepped switching sequence in which the L1 crosspoint based switch spine-and-leaf architecture 200B attempts to identify a switching path in which: 1) no spine crosspoint 204A, 204B, 204C, and 204D (e.g., "CP17", "CP18", "CP19", and "CP20") is utilized when the potential connection includes a source port and a destination port on the same leaf crosspoint 202A, 202B, 202C, 202D. 202E (e.g., "CP0", "CP1", "CP2", "CP3" "CP4", and "CP5"), for example, 2) only free connections between the leaf crosspoints 202A, 202B, 202C, 202D, 202E (e.g., "CP0", "CP1", "CP2", "CP3" "CP4", and "CP5") and spine crosspoints 204A, 204B, 204C, and 204D (e.g., "CP17", "CP18", "CP19", and "CP20") when available, and 3) a reconfiguration or rewiring is executed with respect to one or more of the crosspoints of the input layer of leaf crosspoints 202A, 202B, 202C, 202D, 202E, and 202F (e.g., "CP0", "CP1", "CP2", "CP3" "CP4", and "CP5"), the output layer of leaf crosspoints 202G, 202H, 202I, 202J, 202K, and 202L (e.g., "CP6", "CP7", "CP8", "CP9", "CP10", and "CP11"), and the layer of spine crosspoints 204A, 204B, 204C, and 204D (e.g., "CP17", "CP18", "CP19", and "CP20").

In this way, the present embodiments may provide a graduated or stepped connection path determination in which an L1 crosspoint based switch having a spine-and-leaf architecture attempts to identify a switching path in which: 1) no spine crosspoint is utilized when the potential connection includes a source port and a destination port on the same leaf crosspoint, 2) only free connections between the leaf crosspoint and spine crosspoint are utilized when available, and 3) rewiring is performed with in an ordered sequence of: (a) perform a source to spine rewiring, (b) perform a spine to destination rewiring, (c) perform a source to spine rewiring along with a spine to destination rewiring. (d) perform a source to destination swapping, and (e) apply multicast optimization and restart the ordered rewiring sequence. Thus, the ordered rewiring sequence may ensure that the least possible disruption is always achieved in cases of rewiring an L1 crosspoint based switch having a spine-and-leaf architecture.

For example, referring to FIG. 2B, for a connection from port "0" to port "24," available spine crosspoint CP17 is automatically selected as the first available spine crosspoint and subsequent paths are created to achieve the switching path 206 for the connection from port "0" to port "24." Similarly, for a connection from port "2" to port "33," available spine crosspoint CP19 is automatically selected as the first available spine crosspoint and subsequent paths are created to achieve the switching path 208 for the connection from port "2" to port "33." As further depicted, for a connection from port "3" to port "33," available spine crosspoint CP19 is automatically selected as the first available spine crosspoint and subsequent paths are created to achieve the switching path 210 for the connection from port "3" to port "34."

In particular embodiments, for a new connection (e.g., a not using an existing connection) from port "5" to port "35," a reconfiguration or rewiring may be performed for an existing connection from port "4" to port "28" to make way for the new connection from port "5" to port "35." For example, available spine crosspoint CP18 (e.g., rewired from CP17) is automatically selected as an alternate available spine crosspoint and subsequent paths are created to achieve the switching path 212 for the new connection from port "4" to port "28." As further depicted, then for the connection from port "5" to port "35," available spine crosspoint CP17 (e.g., available to due to the rewiring to CP18 for the connection from port "4" to port "28) is automatically selected as the first available spine crosspoint and subsequent paths are created to achieve the switching path 214 for the connection from port "5" to port "35."

Figure 3A:
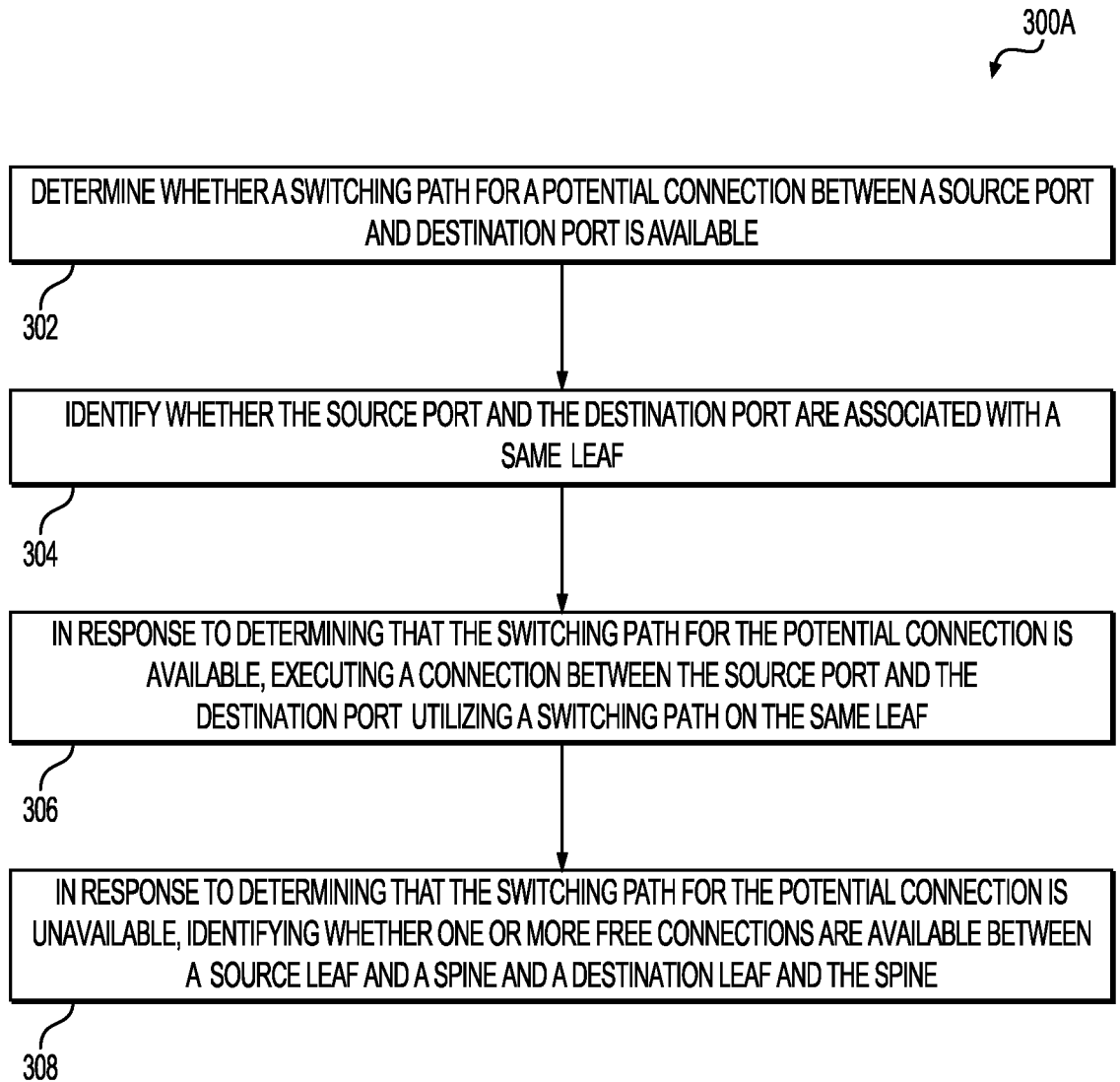
FIG. 3A illustrates a flow diagram of a method for identifying a switching path for one or more source ports and destination ports of a crosspoint based switch including a two-tiered spine-and-leaf architecture.

FIG. 3A illustrates is a flow diagram of a method 300A for identifying a switching path for one or more source ports and destination ports of a crosspoint based switch including a two-tiered spine-and-leaf architecture so as to minimize disruption to existing connections, in accordance with the presently disclosed embodiments. The method 300A may be performed utilizing one or more processors that may include hardware (e.g., a general purpose processor, a graphic processing units (GPU), an application-specific integrated circuit (ASIC), a system-on-chip (SoC), a microcontroller, a field-programmable gate array (FPGA), or any other processing device(s) that may be suitable for processing various data), software (e.g., instructions running/executing on one or more processors), firmware (e.g., microcode), or any combination thereof.

The method 300A may begin at block 302 with a computing system determining whether a switching path for a potential connection between a source port and destination port is available. In some examples, the potential connection between the source port and the destination port may include a unicast connection. In other examples, the potential connection between the source port and the destination port may include a multicast connection. The method 300A may continue at block 304 with the computing system identifying whether the source port and the destination port are associated with a same leaf. For example, in particular embodiments, when the source port and the destination port is associated with the same leaf, the switching path for the potential connection between the source port and the destination port may be executable without utilizing a spine. In particular embodiments, when the source port and the destination port are not associated with the same leaf, the switching path for the potential connection between the source port and the destination port may not be executable without utilizing a spine.

The method 300A may continue at block 306 with the computing system, in response to determining that the switching path for the potential connection between the source port and the destination port is available, executing a connection between the source port and the destination port utilizing a switching path on the same leaf. The method 300A may continue at block 308 with the computing system, in response to determining that the switching path for the potential connection between the source port and the destination port is unavailable, identifying whether one or more free connections are available between 1) a source leaf and a spine and 2) a destination leaf and the spine.

For example, in particular embodiments, when the one or more free connections are available, computing system may determine that the switching path for the potential connection between the source port and the destination port is executable without disruption to existing connections. In particular embodiments, when the one or more free connections are unavailable, the computing system may determine that the switching path for the potential connection between the source port and the destination port is executable by rewiring one or more of the existing connections. For example, the one or more of the existing connections may be rewired so as to create new connection with minimize disruption to the existing.

Figure 3B:
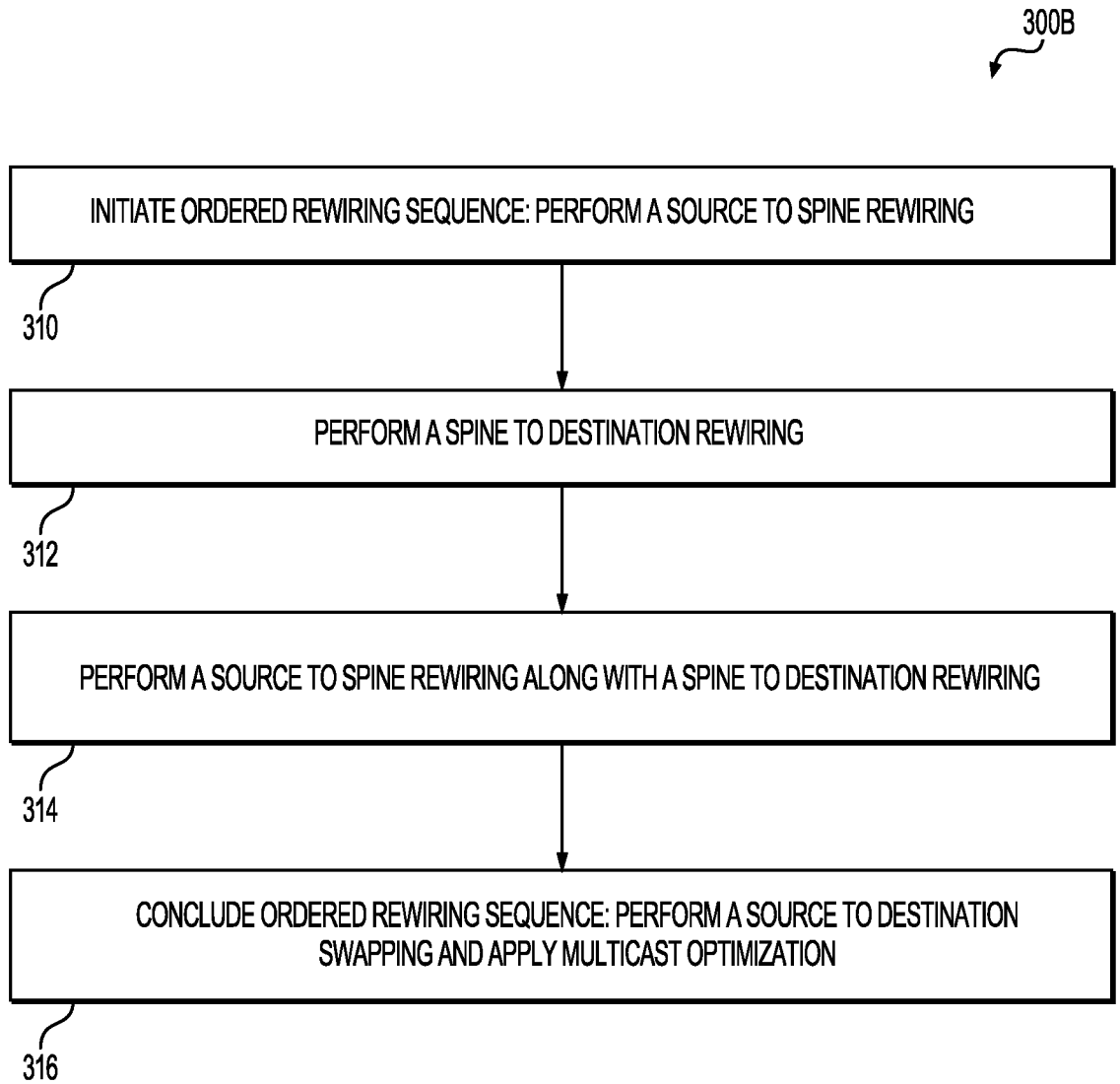
FIG. 3B illustrates is a flow diagram of a method for performing an ordered rewiring sequence for a connection through one or more source ports and destination ports of a crosspoint based switch including a two-tiered spine-and-leaf architecture.
Figure 3C:
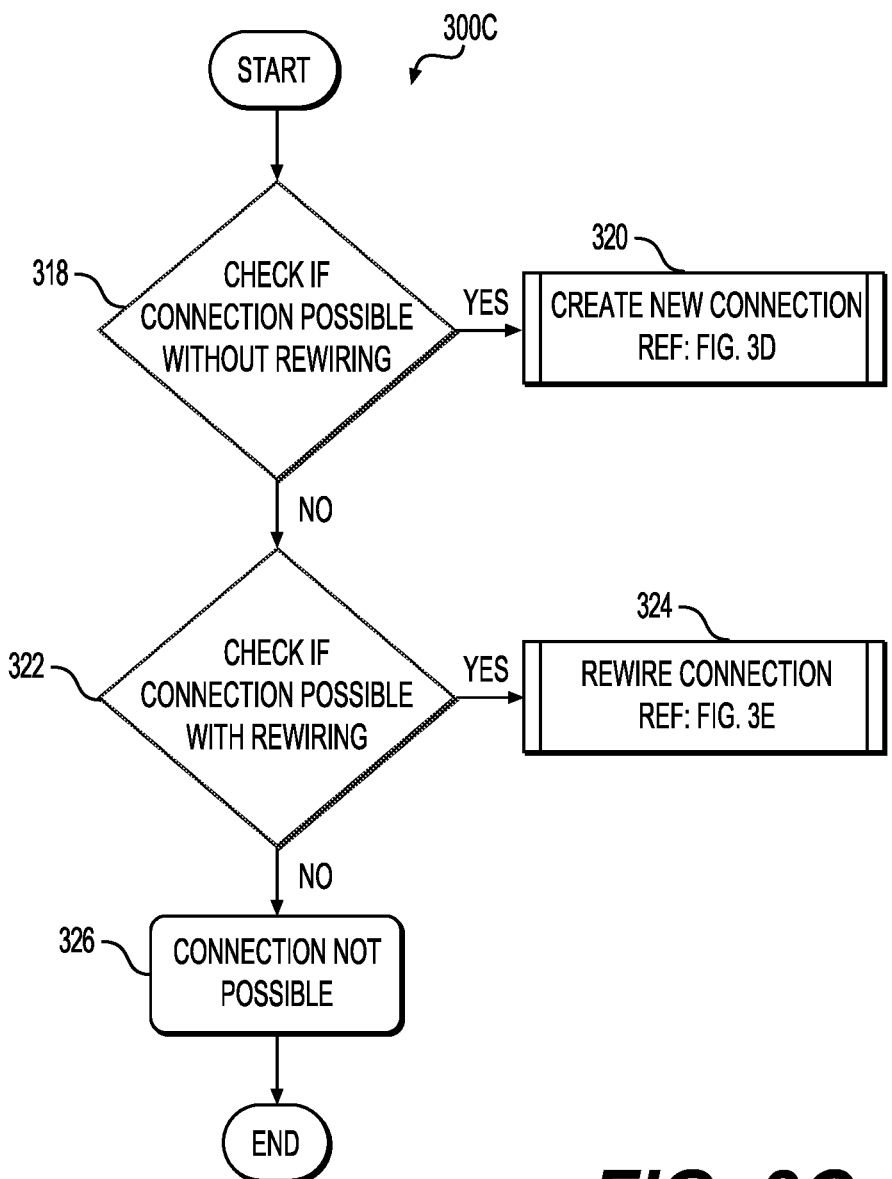
Figure 3D:
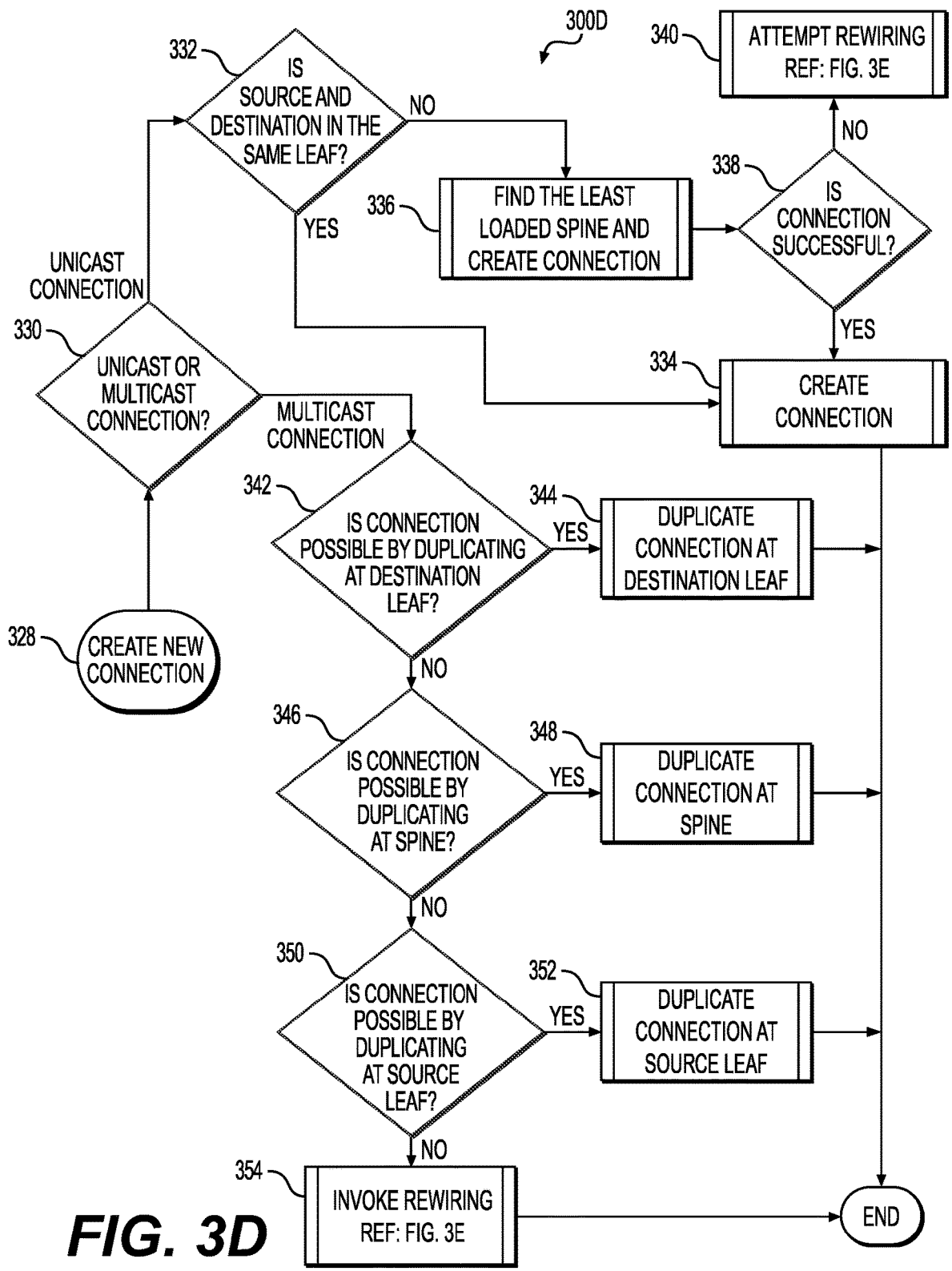
Figure 3E:
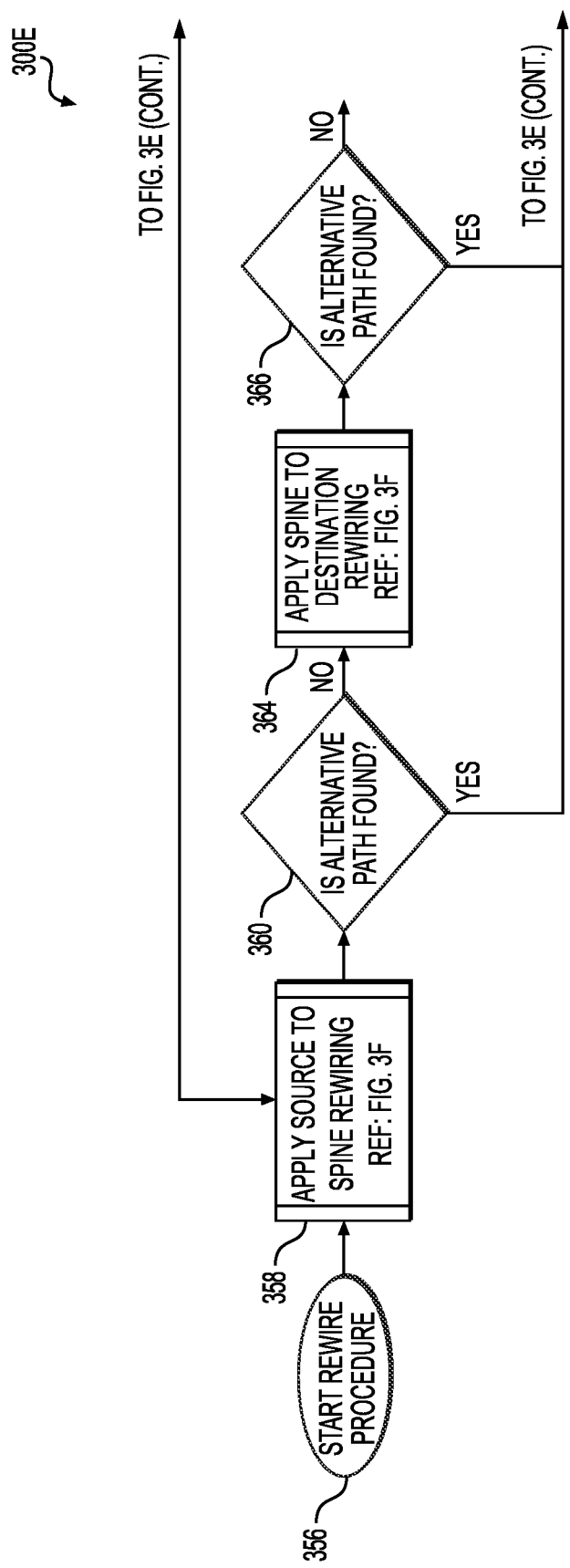
Figure 3E:
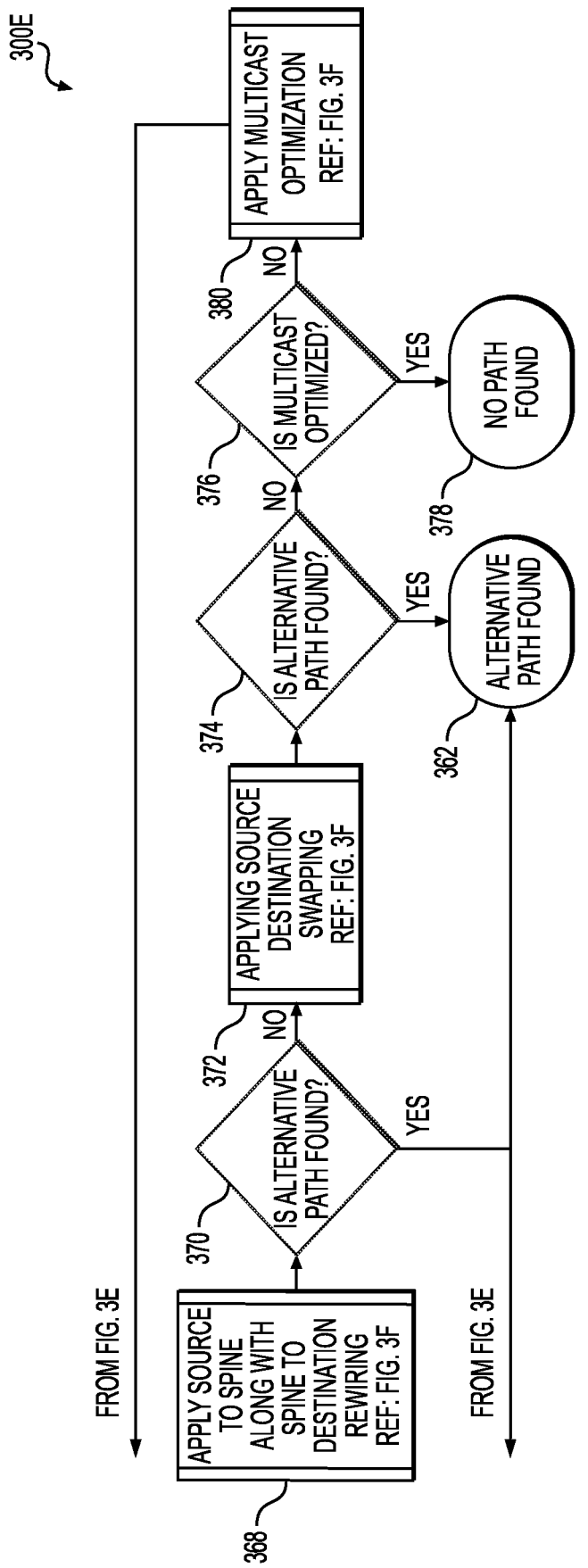

FIG. 3B illustrates is a flow diagram of a method 300B for performing an ordered rewiring sequence for a connection through one or more source ports and destination ports of a crosspoint based switch including a two-tiered spine-and-leaf architecture so as to minimize disruption to existing connections, in accordance with the presently disclosed embodiments. The method 300B may be performed utilizing one or more processors that may include hardware (e.g., a general purpose processor, a graphic processing units (GPU), an application-specific integrated circuit (ASIC), a system-on-chip (SoC), a microcontroller, a field-programmable gate array (FPGA), or any other processing device(s) that may be suitable for processing various data), software (e.g., instructions running/executing on one or more processors), firmware (e.g., microcode), or any combination thereof.

The method 300B may begin at block 310 with the computing system initiate an ordered rewiring sequence by performing a source to spine rewiring. For example, if there is no connection available from source leaf to the spine (e.g., spine from where there is a connection available to destination leaf), the computing system may attempt rewiring an existing connection from source leaf to another spine and checking if the new connection path becomes available. If the new connection path becomes available with rewiring, the computing system may rewire the source circuit and make the connection path available to be established. The method 300B may then continue at block 312 with the computing system performing a spine to destination rewiring. For example, a source to spine rewiring is not possible, the computing system may then attempt to find a connection path by rewiring the connection which is designated to the destination leaf. Specifically, the computing system may attempt to swap an existing destination connection with another free spine or swapping two occupied destination connections. For example, the computing system may attempt to find a path to a spine (e.g., spine which has available link from source leaf) and to the destination leaf.

The method 300B may then continue at block 314 with the computing system performing a source to spine rewiring along with a spine to destination rewiring. For example, when both a source to spine rewiring and a spine to destination rewiring are not possible, the computing system may then generate a list of all possible spines by utilizing both a source to spine rewiring and a spine to destination rewiring together. In particular embodiments, by utilizing a source to spine rewiring, the computing system may find all possible spines reachable from source leaf. In particular embodiments, by utilizing a spine to destination rewiring, the computing system may find all possible connections of spines from where a destination leaf will be accessible. In this way, the computing system may determine the best spines (e.g., with least possible disruptions) and rewire connections to render a path available for the new connection. The method 300B may then conclude at block 316 by performing a source to destination swapping and applying multicast optimization. In particular embodiments, the ordered rewiring sequence may then be restarted. Thus, the ordered rewiring sequence may ensure that the least possible disruption is always achieved in cases of rewiring an L1 crosspoint based switch having a spine-and-leaf architecture.

FIGS. 3C-3F illustrate respective flow diagrams of methods 300C, 300D, 300E, and 300F for performing the foregoing various techniques for identifying a switching path for one or more source ports and destination ports of a crosspoint based switch including a two-tiered spine-and-leaf architecture, in accordance with the presently disclosed embodiments. The methods 300C, 300D, 300E, and 300F may be performed utilizing one or more processors that may include hardware (e.g., a general purpose processor, a graphic processing units (GPU), an application-specific integrated circuit (ASIC), a system-on-chip (SoC), a microcontroller, a field-programmable gate array (FPGA), or any other processing device(s) that may be suitable for processing various data), software (e.g., instructions running/executing on one or more processors), firmware (e.g., microcode), or any combination thereof.

In particular embodiments, the method 300C may begin at decision 318 with a computing system determining if a connection is possible without rewiring. If the connection is possible without rewiring, the method 300C may continue at block 320 with a computing system performing the method 300D as discussed below with respect to FIG. 3D. If the connection is not possible without rewiring, the method 300C may then continue at decision 322 with a computing system determining if a connection is possible with rewiring. If the connection is possible with rewiring, the method 300C may continue at block 324 with a computing system performing the method 300E as discussed below with respect to FIG. 3E. If the connection is not possible with rewiring, the method 300C may continue at block 326 with a computing system determining that the connection is not possible.

In particular embodiments, the method 300D may begin at block 328 with a computing system determining to create a new connection. The method 300D may continue at decision 330 with a computing system determining whether the new connection includes a unicast connection or multicast connection. In particular embodiments, in accordance with a determination that the new connection includes a unicast connection, the method 300D may continue at decision 332 with a computing system determining whether source and destination are on the same leaf. If the source and destination are on the same leaf, the method 300D may continue at block 334 with a computing system creating a new connection. If the source and destination are not on the same leaf, the method 300D may continue at block 336 with a computing system locating the least loaded spine and creating a connection. The method 300D may continue at decision 338 with a computing system determining whether the connection is successful. If the connection is successful, then the unicast connection is created and completed (at block 334). If the connection is not successful, the method 300D may continue at block 338 with a computing system performing the method 300E as discussed below with respect to FIG. 3E.

In particular embodiments, the method 300D may begin at block 328 with a computing system determining to create a new connection. The method 300D may continue at decision 330 with a computing system determining whether the new connection includes a unicast connection or multicast connection. In particular embodiments, in accordance with a determination that the new connection includes a unicast connection, the method 300D may continue at decision 332 with a computing system determining whether source and destination are on the same leaf. If the source and destination are on the same leaf, the method 300D may continue at block 334 with a computing system creating a new connection. If the source and destination are not on the same leaf, the method 300D may continue at block 336 with a computing system locating the least loaded spine and creating a connection. The method 300D may continue at decision 338 with a computing system determining whether the connection is successful. If the connection is successful, then the unicast connection is created and completed (at block 334). If the connection is not successful, the method 300D may continue at block 338 with a computing system performing the method 300E as discussed below with respect to FIG. 3E.

In particular embodiments, in accordance with a determination that the new connection includes a multicast connection, the method 300D may continue at decision 342 with a computing system determining whether a connection is possible by duplicating a connection a destination leaf. In particular embodiments, for a new multicast connection request, new wiring is executed based on rules in accordance ordered sequence which induces the least number of new wirings. For example, in accordance with the present embodiments, the computing system may create a connection according to an ordered sequence in which the computing system adds a minimum number of new connections, and, only if that is not possible, the computing system may proceed with a rewiring that may utilize a greater number of ports. In particular embodiments, in response to determining that a connection is possible by duplicating a connection at a destination leaf, the method 300D may continue at block 344 with a computing system duplicating a connection at a destination leaf.

In particular embodiments, in response to determining that a connection is not possible by duplicating a connection at a destination leaf (e.g., destination port of the new multicast connection request is on a different leaf), the method 300D may continue at decision 346 with a computing system determining whether a connection is possible by duplicating a connection at a spine. If a connection is possible by duplicating a connection at a spine, the method 300D may continue at block 348 with a computing system duplicating a connection at a spine. In particular embodiments, if a connection is not possible by duplicating a connection at a spine, the method 300D may continue at decision 350 with a computing system determining whether a connection is possible by duplicating a connection at a source leaf. If connection is possible by duplicating a connection at a source leaf, the method 300D may continue at block 352 with a computing system duplicating a connection at a source leaf. In particular embodiments, if connection is not possible by duplicating a connection at a source leaf, the method 300D may continue at decision 354 with a computing system invoking a rewiring to create a connection and performing method 300E as discussed below with respect to FIG. 3E. In another embodiment, one or more of the process steps at blocks 344, 348, and 352 may be attempted one or more times.

In particular embodiments, the method 300E may begin at block 356 with a computing system starting a rewiring process. The method 300E may continue at block 358 with a computing system applying a source to spine rewiring in accordance with the method 300F as discussed below with respect to FIG. 3F. For example, in applying a source to spine rewiring, the computing system may select a new spine for an existing connection, such that the new spine may have a route to a destination leaf of a previous connection. In particular embodiments, the computing system may also create a free spine where a new source port may connect to the suitable destination port. In one embodiment, a spine for the source leaf may change where the new source port is requested. In particular embodiments, the method 300E may continue at decision 360 with a computing system determining whether an alternative connection path is found. If an alternative connection path is found, the method 300E may continue at block 362 with a computing system determining that an alternative connection path is found. If an alternative connection path is not found, the method 300E may continue at block 364 with a computing system applying a spine to destination rewiring in accordance with the method 300F as discussed below with respect to FIG. 3F.

In particular embodiments, in applying a spine to destination rewiring, the computing system may select a new spine for an existing connection, such that a new spine may have a route to the source leaf of a previous connection. In particular embodiments, the computing system may also create a free spine where a new source port may connect to the suitable destination port. In one embodiment, a spine for a destination leaf may change where a new destination port is requested. In particular embodiments, the method 300E may continue at decision 366 with a computing system determining whether an alternative connection path is found. If an alternative connection path is found, the method 300E may continue at block 362 with a computing system determining that an alternative connection path is found.

Figure 3F:
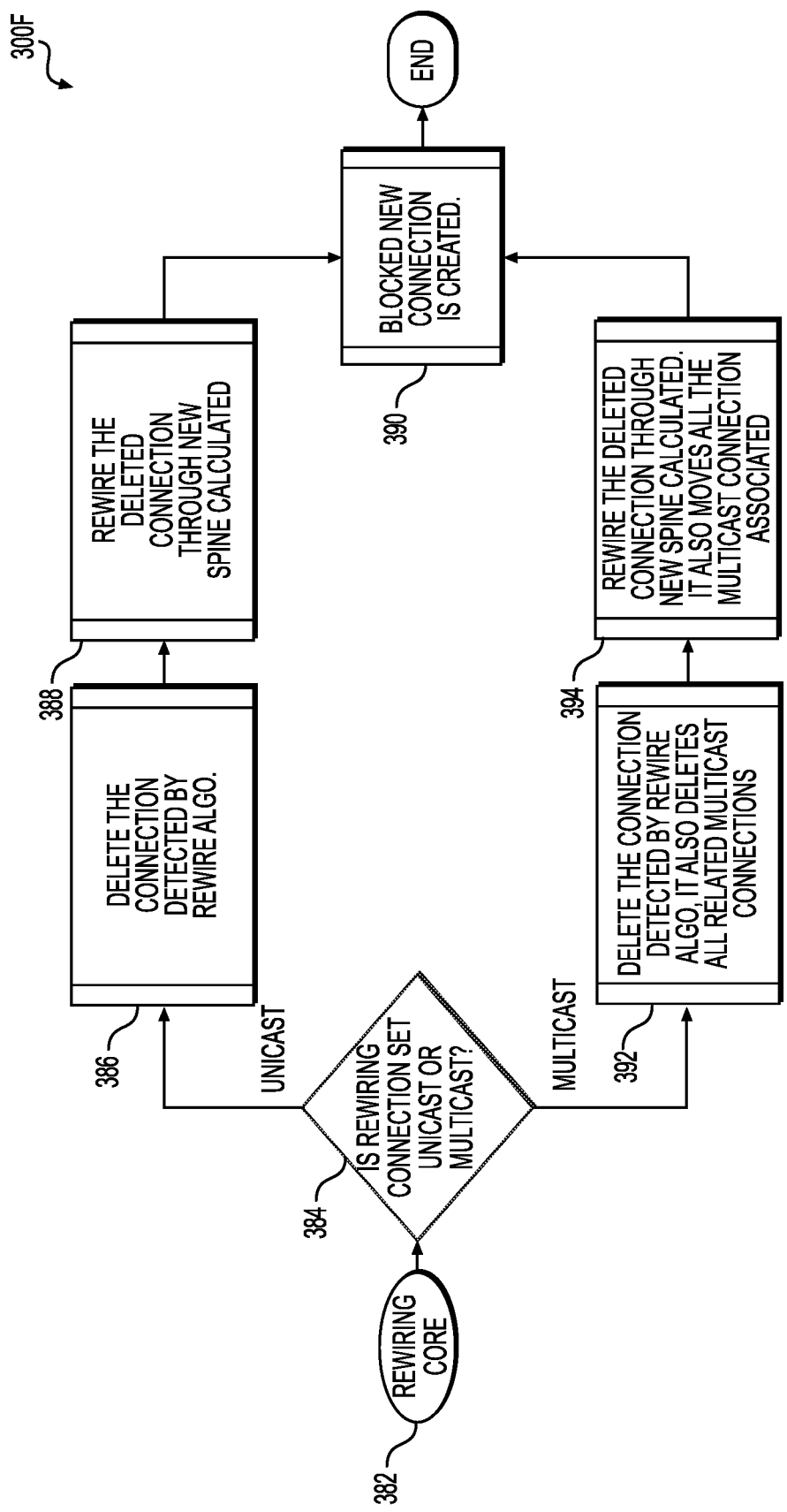

If an alternative connection path is not found, the method 300E may continue at block 368 applying a source to spine rewiring along with a spine to destination rewiring in accordance with method 300F as discussed below with respect to FIG. 3F. In particular embodiments, in applying a source to spine rewiring along with a spine to destination rewiring, the computing system may combine a source to spine rewiring (at block 358) and a spine to destination rewiring (at block 364). In particular embodiments, the computing system may select a new spine, which may have a route to both source and destination. In particular embodiments, the computing system may change wiring for both source and destination.

The method 300E may continue at decision 370 with a computing system determining whether an alternative connection path is found. If an alternative connection path is found, the method 300E may continue at block 362 with a computing system determining that an alternative connection path is found. If an alternative connection path is not found, the method 300E may continue at block 372 applying a source destination swapping in accordance with method 300F as discussed below with respect to FIG. 3F. In particular embodiments, there may be a situation where a common spine is not found, and, thus the computing system may attempt to swap a spine used by ports from a source leaf and ports from a destination leaf. The method 300E may continue at decision 374 with a computing system determining whether an alternative connection path is found.

If an alternative connection path is found, the method 300E may continue at block 362 with a computing system determining that an alternative connection path is found. If an alternative connection path is not found, the method 300E may continue at decision 376 with a computing system determining whether multicast is optimized. If multicast is optimized, the method 300E may continue at block 378 with a computing system determining that no connection path is found. If multicast is not optimized, the method 300E may continue at block 380 with a computing system applying a multicast optimization in accordance with method 300F as discussed below with respect to FIG. 3F. In particular embodiments, in applying multicast optimized, the computing system may apply for multicast optimization, which may include recreating all multicast connections, such that the process utilizes minimal resources.

Figure 4:
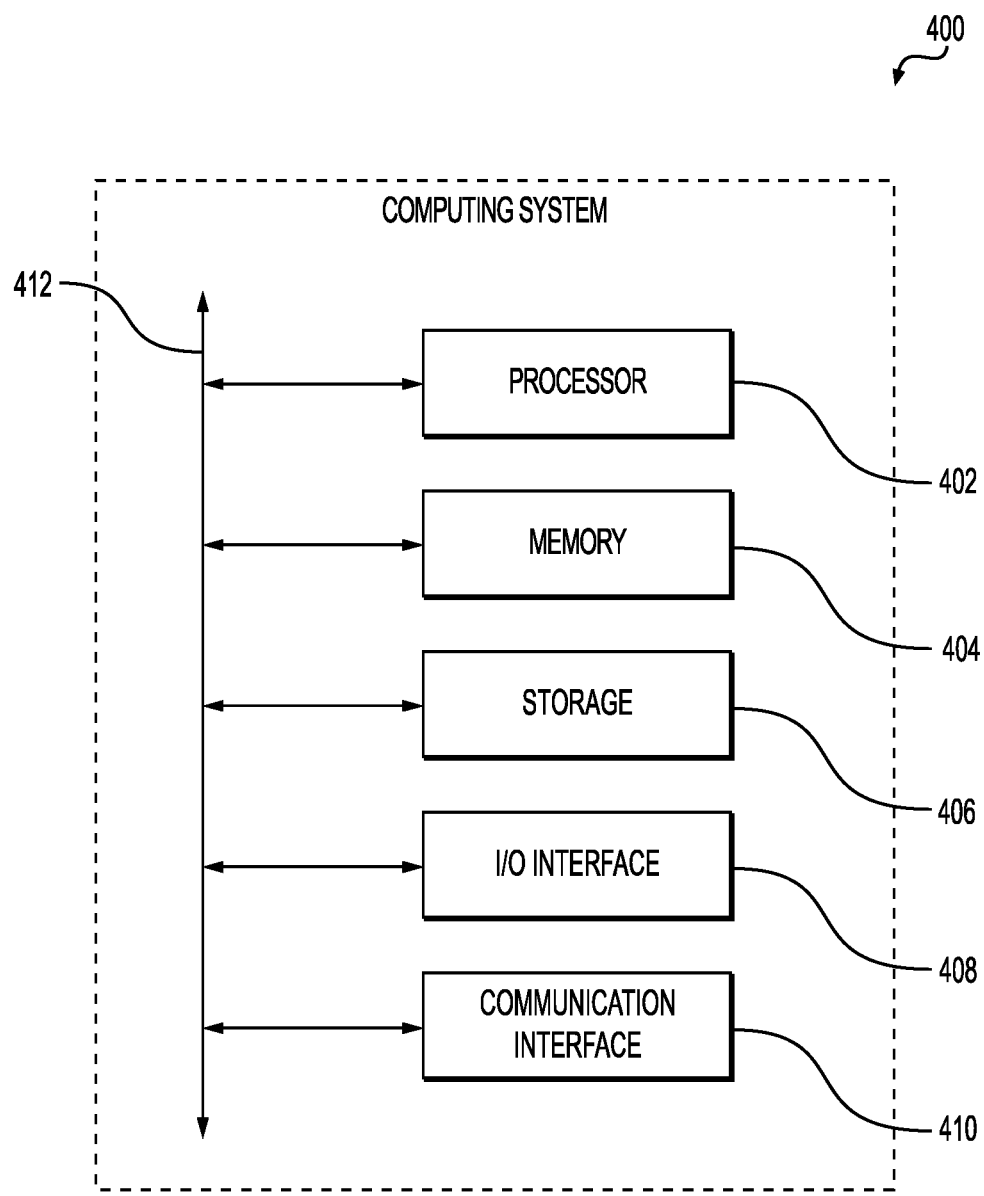
FIG. 4 illustrates an example computer system.

FIG. 4 illustrates an example computer system 400 that may be useful in performing one or more of the foregoing techniques as presently disclosed herein. In particular embodiments, one or more computer systems 400 perform one or more steps of one or more methods described or illustrated herein. In particular embodiments, one or more computer systems 400 provide functionality described or illustrated herein. In particular embodiments, software running on one or more computer systems 400 performs one or more steps of one or more methods described or illustrated herein or provides functionality described or illustrated herein. Particular embodiments include one or more portions of one or more computer systems 400. Herein, reference to a computer system may encompass a computing device, and vice versa, where appropriate. Moreover, reference to a computer system may encompass one or more computer systems, where appropriate.

This disclosure contemplates any suitable number of computer systems 400. This disclosure contemplates computer system 400 taking any suitable physical form. As example and not by way of limitation, computer system 400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 400 may include one or more computer systems 400; be unitary or distributed; span multiple locations; span multiple machines; span multiple data centers; or reside in a cloud, which may include one or more cloud components in one or more networks. Where appropriate, one or more computer systems 400 may perform without substantial spatial or temporal limitation one or more steps of one or more methods described or illustrated herein.

As an example, and not by way of limitation, one or more computer systems 400 may perform in real time or in batch mode one or more steps of one or more methods described or illustrated herein. One or more computer systems 400 may perform at different times or at different locations one or more steps of one or more methods described or illustrated herein, where appropriate. In particular embodiments, computer system 400 includes a processor 402, memory 404, storage 406, an input/output (I/O) interface 408, a communication interface 410, and a bus 412. Although this disclosure describes and illustrates a particular computer system having a particular number of particular components in a particular arrangement, this disclosure contemplates any suitable computer system having any suitable number of any suitable components in any suitable arrangement.

In particular embodiments, processor 402 includes hardware for executing instructions, such as those making up a computer program. As an example, and not by way of limitation, to execute instructions, processor 402 may retrieve (or fetch) the instructions from an internal register, an internal cache, memory 404, or storage 406; decode and execute them; and then write one or more results to an internal register, an internal cache, memory 404, or storage 406. In particular embodiments, processor 402 may include one or more internal caches for data, instructions, or addresses. This disclosure contemplates processor 402 including any suitable number of any suitable internal caches, where appropriate. As an example, and not by way of limitation, processor 402 may include one or more instruction caches, one or more data caches, and one or more translation lookaside buffers (TLBs). Instructions in the instruction caches may be copies of instructions in memory 404 or storage 406, and the instruction caches may speed up retrieval of those instructions by processor 402. Data in the data caches may be copies of data in memory 404 or storage 406 for instructions executing at processor 402 to operate on; the results of previous instructions executed at processor 402 for access by subsequent instructions executing at processor 402 or for writing to memory 404 or storage 406; or other suitable data. The data caches may speed up read or write operations by processor 402. The TLBs may speed up virtual-address translation for processor 402. In particular embodiments, processor 402 may include one or more internal registers for data, instructions, or addresses. This disclosure contemplates processor 402 including any suitable number of any suitable internal registers, where appropriate. Where appropriate, processor 402 may include one or more arithmetic logic units (ALUs); be a multi-core processor; or include one or more processors 402. Although this disclosure describes and illustrates a particular processor, this disclosure contemplates any suitable processor.

In particular embodiments, memory 404 includes main memory for storing instructions for processor 402 to execute or data for processor 402 to operate on. As an example, and not by way of limitation, computer system 400 may load instructions from storage 406 or another source (such as, for example, another computer system 400) to memory 404. Processor 402 may then load the instructions from memory 404 to an internal register or internal cache. To execute the instructions, processor 402 may retrieve the instructions from the internal register or internal cache and decode them. During or after execution of the instructions, processor 402 may write one or more results (which may be intermediate or final results) to the internal register or internal cache. Processor 402 may then write one or more of those results to memory 404. In particular embodiments, processor 402 executes only instructions in one or more internal registers or internal caches or in memory 404 (as opposed to storage 406 or elsewhere) and operates only on data in one or more internal registers or internal caches or in memory 404 (as opposed to storage 406 or elsewhere).

One or more memory buses (which may each include an address bus and a data bus) may couple processor 402 to memory 404. Bus 412 may include one or more memory buses, as described below. In particular embodiments, one or more memory management units (MMUs) reside between processor 402 and memory 404 and facilitate accesses to memory 404 requested by processor 402. In particular embodiments, memory 404 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 404 may include one or more memories 404, where appropriate. Although this disclosure describes and illustrates particular memory, this disclosure contemplates any suitable memory.

In particular embodiments, storage 406 includes mass storage for data or instructions. As an example, and not by way of limitation, storage 406 may include a hard disk drive (HDD), a floppy disk drive, flash memory, an optical disc, a magneto-optical disc, magnetic tape, or a Universal Serial Bus (USB) drive or a combination of two or more of these. Storage 406 may include removable or non-removable (or fixed) media, where appropriate. Storage 406 may be internal or external to computer system 400, where appropriate. In particular embodiments, storage 406 is non-volatile, solid-state memory. In particular embodiments, storage 406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 406 taking any suitable physical form. Storage 406 may include one or more storage control units facilitating communication between processor 402 and storage 406, where appropriate. Where appropriate, storage 406 may include one or more storages 406. Although this disclosure describes and illustrates particular storage, this disclosure contemplates any suitable storage.

In particular embodiments, I/O interface 408 includes hardware, software, or both, providing one or more interfaces for communication between computer system 400 and one or more I/O devices. Computer system 400 may include one or more of these I/O devices, where appropriate. One or more of these I/O devices may enable communication between a person and computer system 400. As an example, and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 408 for them. Where appropriate, I/O interface 408 may include one or more device or software drivers enabling processor 402 to drive one or more of these I/O devices. I/O interface 408 may include one or more I/O interfaces 408, where appropriate. Although this disclosure describes and illustrates a particular I/O interface, this disclosure contemplates any suitable I/O interface.

In particular embodiments, communication interface 410 includes hardware, software, or both providing one or more interfaces for communication (such as, for example, packet-based communication) between computer system 400 and one or more other computer systems 400 or one or more networks. As an example, and not by way of limitation, communication interface 410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 410 for it.

As an example, and not by way of limitation, computer system 400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 400 may include any suitable communication interface 410 for any of these networks, where appropriate. Communication interface 410 may include one or more communication interfaces 410, where appropriate. Although this disclosure describes and illustrates a particular communication interface, this disclosure contemplates any suitable communication interface.

In particular embodiments, bus 412 includes hardware, software, or both coupling components of computer system 400 to each other. As an example and not by way of limitation, bus 412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 412 may include one or more buses 412, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method for identifying a switching path for one or more source ports and destination ports of a crosspoint based switch including a two-tiered spine-and-leaf architecture, the method comprising:
    determining whether a switching path for a potential connection between a source port and a destination port is available, wherein determining whether the switching path for the potential connection between the source port and the destination port is available comprises:
        identifying whether the source port and the destination port are associated with a same leaf, wherein:
            when the source port and the destination port are associated with the same leaf, the switching path for the potential connection between the source port and the destination port is executable without utilizing a spine; and
            when the source port and the destination port are not associated with the same leaf, the switching path for the potential connection between the source port and the destination port is executable by utilizing a spine;
    in response to determining that the switching path for the potential connection between the source port and the destination port is available, executing a connection between the source port and the destination port utilizing a switching path on the same leaf; and
    in response to determining that the switching path for the potential connection between the source port and the destination port is unavailable:
        identifying whether one or more free connections are available between 1) a source leaf and a spine and 2) a destination leaf and the spine, wherein:
            when the one or more free connections are available, the switching path for the potential connection between the source port and the destination port is executable without disruption to existing connections; and
            when the one or more free connections are unavailable, the switching path for the potential connection between the source port and the destination port is executable by rewiring one or more of the existing connections, the one or more of the existing connections being rewired so as to minimize disruption to the existing connections.

2. The method of claim 1, further comprising:
    in response to determining that the switching path for the potential connection between the source port and the destination port is unavailable, executing a connection between the source port and the destination port utilizing a switching path based on the one or more free connections.

3. The method of claim 1, further comprising:
    in response to determining that the switching path for the potential connection between the source port and the destination port is unavailable, executing a connection between the source port and the destination port utilizing a switching path based on the rewiring of one or more of the existing connections.

4. The method of claim 1, wherein the potential connection between the source port and the destination port comprises a unicast connection.

5. The method of claim 1, wherein the potential connection between the source port and the destination port comprises a multicast connection.

6. The method of claim 5, wherein the destination port comprises a first destination port, the method further comprising:
    when the first destination port and a second destination port are associated with a same leaf, executing the connection between the source port and the destination port by duplicating the switching path on the same leaf; and
    when the first destination port and the second destination port are each associated with a different leaf, executing the connection between the source port and the destination port by duplicating the switching path on a same spine.

7. The method of claim 6, the method further comprising:
    when at least one of the duplication of the switching path on the same leaf or the duplication of the switching path on the same spine is unavailable, executing the connection between the source port and the destination port utilizing a plurality of spines.

8. The method of claim 1, wherein the rewiring of one or more of the existing connections comprises a source port to a spine rewiring.

9. The method of claim 1, wherein the rewiring of one or more of the existing connections comprises a spine to destination port rewiring.

10. The method of claim 1, wherein the rewiring of one or more of the existing connections comprises 1) a source port to a spine rewiring and 2) a spine to destination port rewiring.

11. A computing system for identifying a switching path for one or more source ports and destination ports of a crosspoint based switch including a two-tiered spine-and-leaf architecture, the system comprising:
    one or more non-transitory computer-readable storage media including instructions; and
    one or more processors coupled to the storage media, the one or more processors configured to execute the instructions to:
        determine whether a switching path for a potential connection between a source port and a destination port is available, wherein determining whether the switching path for the potential connection between the source port and the destination port is available comprises:
            identifying whether the source port and the destination port are associated with a same leaf, wherein:
                when the source port and the destination port are associated with the same leaf, the switching path for the potential connection between the source port and the destination port is executable without utilizing a spine; and
                when the source port and the destination port is not associated with the same leaf, the switching path for the potential connection between the source port and the destination port is executable by utilizing a spine;
        in response to determining that the switching path for the potential connection between the source port and the destination port is available, execute a connection between the source port and the destination port utilizing a switching path on the same leaf; and in response to determining that the switching path for the potential connection between the source port and the destination port is unavailable:
identifying whether one or more free connections are available between 1) a source leaf and a spine and 2) a destination leaf and the spine, wherein:
when the one or more free connections are available, the switching path for the potential connection between the source port and the destination port is executable without disruption to existing connections; and
when the one or more free connections are unavailable, the switching path for the potential connection between the source port and the destination port is executable by rewiring one or more of the existing connections, the one or more of the existing connections being rewired so as to minimize disruption to the existing connections.

12. The computing system of claim 11, wherein the instructions further comprise instructions to:
in response to determining that the switching path for the potential connection between the source port and the destination port is unavailable, execute a connection between the source port and the destination port utilizing a switching path based on the one or more free connections.

13. The computing system of claim 11, wherein the instructions further comprise instructions to:
in response to determining that the switching path for the potential connection between the source port and the destination port is unavailable, execute a connection between the source port and the destination port utilizing a switching path based on the rewiring of one or more of the existing connections.

14. The computing system of claim 11, wherein the potential connection between the source port and the destination port comprises a multicast connection.

15. The computing system of claim 14, wherein the destination port comprises a first destination port, the instructions further comprising instructions to:
when the first destination port and a second destination port are associated with a same leaf, execute the connection between the source port and the destination port by duplicating the switching path on the same leaf; and
when the first destination port and the second destination port are each associated with a different leaf, execute the connection between the source port and the destination port by duplicating the switching path on a same spine.

16. The computing system of claim 15, the instructions further comprising instructions to:
when at least one of the duplication of the switching path on the same leaf or the duplication of the switching path on the same spine is unavailable, executing the connection between the source port and the destination port utilizing a plurality of spines.

17. The computing system of claim 11, wherein the rewiring of one or more of the existing connections comprises a source port to a spine rewiring.

18. The computing system of claim 11, wherein the rewiring of one or more of the existing connections comprises a spine to destination port rewiring.

19. The computing system of claim 11, wherein the rewiring of one or more of the existing connections comprises 1) a source port to a spine rewiring and 2) a spine to destination port rewiring.

20. A non-transitory computer-readable medium comprising instructions that, when executed by one or more processors of a computing system, cause the computing system to:
determine whether a switching path for a potential connection between a source port and a destination port is available, wherein determining whether the switching path for the potential connection between the source port and the destination port is available comprises:
identifying whether the source port and the destination port is associated with a same leaf, wherein:
when the source port and the destination port are associated with the same leaf, the switching path for the potential connection between the source port and the destination port is executable without utilizing a spine; and
when the source port and the destination port are not associated with the same leaf, the switching path for the potential connection between the source port and the destination port is executable by utilizing a spine;
in response to determining that the switching path for the potential connection between the source port and the destination port is available, execute a connection between the source port and the destination port utilizing a switching path on the same leaf; and
in response to determining that the switching path for the potential connection between the source port and the destination port is unavailable:
identifying whether one or more free connections are available between 1) a source leaf and a spine and 2) a destination leaf and the spine, wherein:
when the one or more free connections are available, the switching path for the potential connection between the source port and the destination port is executable without disruption to existing connections; and
when the one or more free connections are unavailable, the switching path for the potential connection between the source port and the destination port is executable by rewiring one or more of the existing connections, the one or more of the existing connections being rewired so as to minimize disruption to the existing connections.

\* \* \* \* \*